Oct. 15, 1963 W. ORDINETZ ETAL 3,106,854
SCREW SHEATH
Filed Nov. 28, 1961
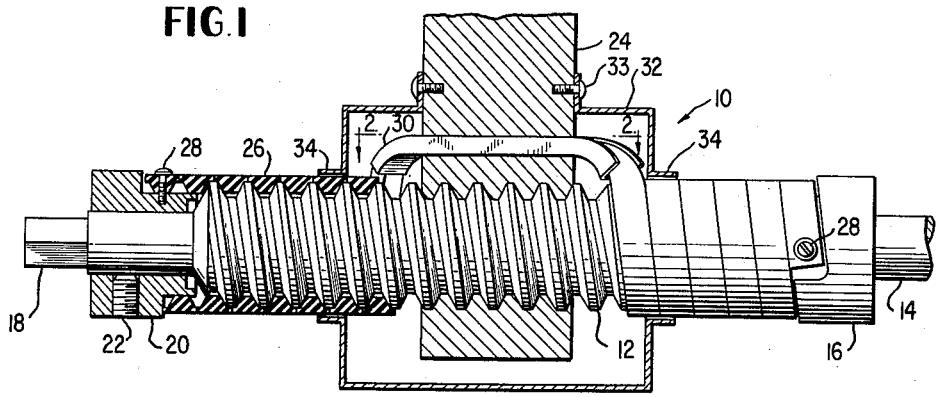
FIG.1
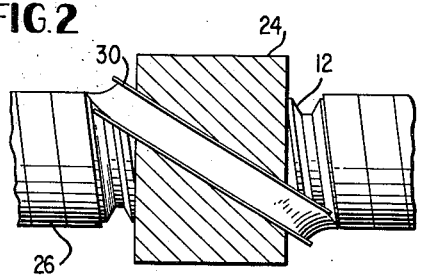
FIG.2
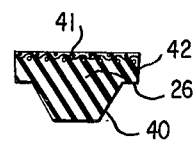
FIG.4
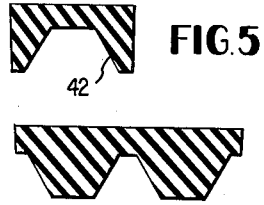
FIG.5
FIG.6
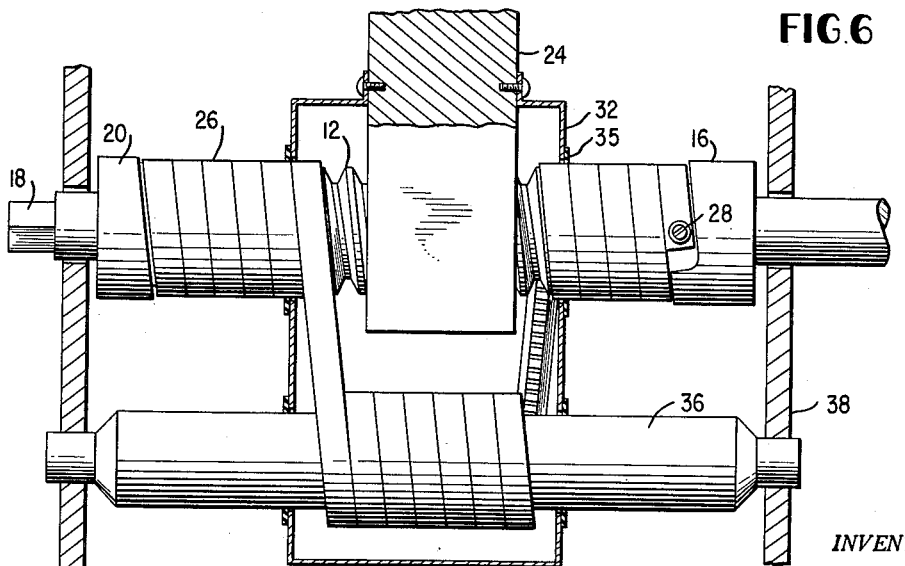
FIG.3
INVENTORS
WALTER ORDINETZ
BY WALTER SHULTZ
Sughrue, Rothwell, Mion & Zinn
ATTORNEYS

United States Patent Office 3,106,854
Patented Oct. 15, 1963

3,106,854
SCREW SHEATH
Walter Ordinetz, 58 Merrill St., Springfield, Vt., and
Walter Shultz, 24 Sullivan St., Newport, N.H.
Filed Nov. 28, 1961, Ser. No. 155,425
10 Claims. (Cl. 74—606)

This invention relates to a screw sheath for protecting a screw and nut assembly from foreign matter such as dirt and grime.

Screw and nut assemblies are commonly used as power transmitting elements in environments where oil, oily dirt, grease, dust, etc., get on and between the threads of the screw. This foreign matter is likely to jam the operation of the screw and nut assembly or at least decrease its efficiency. This invention provides a means to protect screws and similar power transmission devices by utilizing a continuous protective sheath extending from end-to-end of the screw threads.

The sheath functions as a protective cover and is wrapped on the threads of the screw but bypasses the screw threads where they cooperate with the nut. The protective sheath is wrapped along the entire length of the thread on both sides of the nut and is fastened directly to the screw so that as the screw and nut move relative to one another, there is no winding-up of the threads, and no portion of the lead screw is exposed to foreign matter.

It is also desirable that the sheath be adjustable in its length to insure a close grip on the screw compensating for wear and stretch of the resilient sheath. This invention provides means for taking up or tightening the thread to accomplish this.

A better understanding of the invention together with further objects and advantages thereof will be further understood from a consideration of the following description taken in connection with the accompanying drawing.

In the drawing:

FIG. 1 is a side elevation view partly in section of a screw and nut assembly provided with the improved screw sheath protective device of this invention;

FIG. 2 is a partial sectional view taken along line 2—2 of FIG. 1;

FIG. 3 is an elevation view partially in section of a modification of the screw sheath bypass and take-up means for the sheath;

FIG. 4 is a detailed sectional view through one form of the screw sheath;

FIG. 5 is a detailed sectional view through another form of the thread protective sheath; and FIG. 6 is a sectional view of a further modification of the screw sheath.

Referring to the drawings, in FIG. 1 the screw and nut assembly 10 includes a helically threaded screw member 12 formed on a screw shaft 14 and provided with an end collar 16 as well as a shaft-operating crank 18. The shaft also has a collar 20 rigidly secured thereto in adjustable manner by a set screw 22. The collar 16 may also be adjustable, if desired, for purposes to be explained hereinafter.

A nut 24 is internally threaded for cooperation with the screw 12 and in the modification of FIG. 1 is adapted to be stationary, although such is not a limitation on the invention. With nut 24 stationary and the crank 18 actuated, the screw 12 will travel axially relative to the nut to transmit any load by means of the screw shaft 14. If desired, alternative motion could be provided wherein the screw shaft is stationary and the nut travels axially as is well known, or the screw and the nut both move at differing rates.

The protective device of this invention includes a sheath-like band or strip 26 wrapped around the screw 12 with the edges of the band in contact as shown in FIG. 1. Screws 28 secure the ends of the band to collars 16 and 20. It may be seen that by loosening set screw 22 and adjusting collar 20 relative to screw 12, the sheath 26 may be tightened or loosened as desired. Thus, means are provided for adjusting the tightness or looseness of the wrap of the sheath 26 or the screw 12. Other take-up means for the sheath could be utilized such as a sheath tightener on the nut.

The sheath strip 26 bypasses the screw 12 and nut 24 at the place where they are in engagement. In the modification of FIG. 1 this bypass means includes a channel-shaped bypass guide 30 extending through the nut 24. The sheath 26 passes up from the threads of screw 12 to the bypass guide 30 extending through nut 24 and is wrapped around the screw threads 12 at the opposite side of the nut. FIG. 2 is a sectional view showing the bypass guide and nut configuration.

A housing 32, provided with aligned openings 34 for the screw threads to pass through, may be secured to the nut by screws 33 or the like. The housing surrounds portions of the nut and of the screw threads to shield that portion of the assembly where the screw sheath 26 does not cover the threads of the screw 12 immediately adjacent the nut 24. It may be seen with the assembly of FIG. 1 that any dirt and grime is prevented from entering the device from the outside.

FIG. 3 illustrates a modification of the device wherein the bypass means around a portion of screw 12 and nut 24 includes a separate shaft 36 journaled in a support 38. In this modification, the bypass is entirely external to the nut 24. In this embodiment the housing 32, surrounding portions of the nut 24, screw 12 and shaft 36, is provided with small flexible rubber seals 35 at the aligned openings thereof for preventing foreign matter from entering into the housing and clogging the threads of screw 12 immediately adjacent the sides of the nut 24.

FIG. 4 shows a detail sectional view of the screw sheath. It may be seen that the sheath consists of a strip of resilient, flexible material such as oil-resistant rubber, such as neoprene or any other suitable material and is about the same width as the lead of the helix. The underside 40 of the strip 26 is at least partially complementary to the thread form so as to conform and locate on the helix such that the sheath can be wound on the screw in a continuous strip from end-to-end. The sides 42 of the strip 26 are slightly tapered from the top down so that when in abutting relationship they form a pressure seal at the top edge. Also, a wire mesh fabric or other suitable backing 41 may be provided on this sheath for strength.

While FIG. 4 shows a male form of sheath, it is obvious that other forms could be used. For example, FIG. 5 shows a female form of sheath wherein the bottom of the sheath band 42 is partially complementary to the thread form in a relieved manner.

Also, the sheath can cover two thread spaces as shown in the FIG. 6 embodiment. There could also be employed two single sheaths in parallel utilizing two bypasses at the nut, or any other suitable arrangement for a multiple-lead thread.

It can be seen that applicants have disclosed a unique device for protecting a screw and nut power transmission assembly from foreign matter. The basic principle disclosed by applicants is the use of a strip of flexible, resilient material fitting over any type of machined thread to completely cover and protect it from foreign matter and yet not interfere with its function as a lead screw and nut assembly.

Additional features which may be employed in practicing the invention include the use of wipers on each end of the nut to further insure that no foreign matter enters that area between the nut threads and the screw. Further additions to this system may include built-in cleaning baths as well as means for lubricating the sheath for maximum protection of the screw.

While there have been shown and described and pointed out the fundamental novel features of the invention as applied to preferred embodiments, it will be understood that various omissions and substitutions and changes in the form and detail of the device illustrated and in its operation may be made by those skilled in the art without departing from the spirit of the invention. It is the intention, therefore, to be limited only as indicated by the scope of the following claims.

What is claimed is:

1. A screw sheath protection device for a threaded screw and cooperating nut assembly, the device comprising; a flexible resilient band wrapped around the threads of the screw, means for bypassing the flexible band around the portion of the screw that is in contact with the nut, the underside of the band in contact with the screw thread and having at least partial complementary configuration to the threads and the edges of the band abutting when the band is wrapped around the screw thereby keeping out dirt and grime from the screw threads, and securing means for fastening each end of the flexible band to the screw on opposite sides of the nut and out of the path of travel of the nut.

2. A screw sheath protection device for a threaded screw and cooperating nut assembly as defined in claim 1 further comprising a protective housing surrounding the screw and nut assembly at the nut portion thereof and having aligned openings for the screw with sheath thereon to protrude therethrough so that the bypassed portion of the screw threads adjacent the nut are also protected from outside dirt and grime.

3. A screw sheath protection device for a threaded screw and cooperating nut assembly as defined in claim 2 further comprising adjustable means for taking up slack in the screw sheath.

4. A screw sheath protection device for a threaded screw and cooperating nut assembly as defined in claim 3 wherein the adjustable means are included in the means for securing the ends of the sheath to the screw.

5. A screw sheath protection device for a threaded screw and cooperating nut assembly as defined in claim 1 wherein the bypass means includes a band guide extending through the nut.

6. A screw sheath protection device for a threaded screw and cooperating nut assembly as defined in claim 1 wherein the band bypass means includes a separate journaled shaft around which said band is wrapped, said shaft positioned parallel to the screw.

7. A screw sheath protection device for a threaded screw and cooperating nut assembly as defined in claim 1 wherein the abutting edges of said band are tapered inwardly from top to bottom to form a pressure seal with adjacent wrapped portions of said band.

8. A screw and nut power transmission assembly including a threaded screw and an internally threaded cooperating nut and further comprising; a pair of collars mounted at opposite ends of said screw, at least one of said collars being adjustable relative to said screw, a bypass guide through said nut, a flexible resilient band the underside of which has a contour at least partially complementary to said threaded screw, said band passing through said nut along said guide, wrapped around said screw on opposite sides of the nut with adjacent edges abutting, and connected to said collars, and a housing surrounding said bypass guide and portions of said threaded screw and nut.

9. A screw and nut power transmission assembly including a threaded screw and an internally threaded cooperating nut and further comprising; a pair of collars mounted at opposite ends of said screw, at least one of said collars being adjustable relative to said screw, a journaled shaft mounted parallel to said screw, a flexible resilient band the underside of which has a contour at least partially complementary to said threaded screw, said band wrapped about a portion of said shaft and about said screw on opposite sides of the nut such that adjacent edges of the band in contact with the screw are abutting, the ends of said band connected to said collars, and a housing surrounding portions of said screw, nut and shaft.

10. In a screw and nut power transmission assembly including a threaded screw and an internally threaded cooperating nut for transmitting power, the improvement that comprises; a screw sheath constructed of a band of flexible material having a configuration to engage the threads of the screw when wrapped therearound with the edges of the sheath abutting, means for attaching each end of the sheath to each end of the screw and means for bypassing the sheath during movement of the screw and nut from one side of the nut to the other.

No references cited.